US008345790B2

(12) United States Patent
Sartori et al.

(10) Patent No.: US 8,345,790 B2
(45) Date of Patent: Jan. 1, 2013

(54) METHOD AND APPARATUS FOR TRANSMISSION WITHIN A MULTI-CARRIER COMMUNICATION SYSTEM

(75) Inventors: Philippe J. Sartori, Algonquin, IL (US); Kevin L. Baum, Rolling Meadows, IL (US); Timothy A. Thomas, Palatine, IL (US)

(73) Assignee: Motorola Mobility LLC, Libertyville, IL (US)

( * ) Notice: Subject to any disclaimer, the term of this patent is extended or adjusted under 35 U.S.C. 154(b) by 0 days.

(21) Appl. No.: 13/356,665

(22) Filed: Jan. 24, 2012

(65) Prior Publication Data

US 2012/0140843 A1    Jun. 7, 2012

Related U.S. Application Data

(62) Division of application No. 11/679,272, filed on Feb. 27, 2007, now Pat. No. 8,126,076.

(51) Int. Cl.
*H04B 7/02* (2006.01)
*H04L 1/02* (2006.01)
(52) U.S. Cl. ......... 375/267; 375/260; 370/203; 370/208
(58) Field of Classification Search .................. 375/260, 375/267, 299, 347; 370/203–211
See application file for complete search history.

(56) References Cited

U.S. PATENT DOCUMENTS

| 2002/0193146 A1 | 12/2002 | Wallace et al. |
| 2007/0165566 A1 | 7/2007 | Khan et al. |
| 2008/0101441 A1* | 5/2008 | Palanki et al. ................ 375/146 |

FOREIGN PATENT DOCUMENTS

| JP | 2000224096 | | 8/2000 |
| WO | 2005104399 | A1 | 11/2005 |
| WO | 2005112329 | A1 | 11/2005 |
| WO | 2005114939 | A1 | 12/2005 |
| WO | 2006135187 | A2 | 12/2006 |

OTHER PUBLICATIONS

A. Wittneben, "A New Bandwidth Efficient Transmit Antenna Modulation Diversity Scheme for Linear Digital Modulation," IEEE ICC-1993, pp. 1630-1634.
J. Tan, et al., "Multicarrier Delay Diversity Modulation for MIMO Systems," IEEE TrapHPnsactions on Wireless Communications, vol. 3, No. 5, Sep. 2004, pp. 1756-1763.
Toshiba Corporation, NTT DoCoMo: "MBMS Channel Structure for Evolved UTRA", TSG-RAN WG1 #44, R1-060427, Denver, USA, Feb. 13-17, 2006, all pages.

(Continued)

*Primary Examiner* — Curtis Odom

(57) ABSTRACT

Multiple transmit antenna transmission together with preferably pseudo-random, antenna-specific, scrambling (PRAS) is utilized to scramble incoming data differently on different antennas for those users requiring frequency diversity type transmissions. When PRAS is activated for a particular allocation, each transmit antenna applies a different scrambling sequence to the data symbols that are transmitted in the allocation.

14 Claims, 5 Drawing Sheets

OTHER PUBLICATIONS

IEEE 802.16—IEEE Standard for Local and Metropolitan area Networks—Part 16: Air Interface for Fixed Broadband Wireless Access Systems, Institute of Electrical and Electronic Engineers, New York, NY, USA, Oct. 1, 2004, Section 8.4.8, pp. 579-587.

3GPP TR 25.814, "Physical Layer Aspects for Evolved UTRA," v.1.2.1, Feb. 2006, Sec. 7.1.1 through Sec. 7.1.1.4, pp. 1, 20-33.

Ericsson, "System-level evaluation of OFDM—further considerations," 3GPP TSG-RAN WG1 #35, R1-031303, Lisbon, Portugal, Nov. 17-21, 2003, pp. 1-6.

Hottinen, A.; Tirkkonen, O., "A randomization technique for non-orthogonal space-time block codes," Vehicular Technology Conference, 2001, VTC 2001 Spring, IEEE VTS 53rd, vol. 2, 2001, pp. 1479-1482.

* cited by examiner

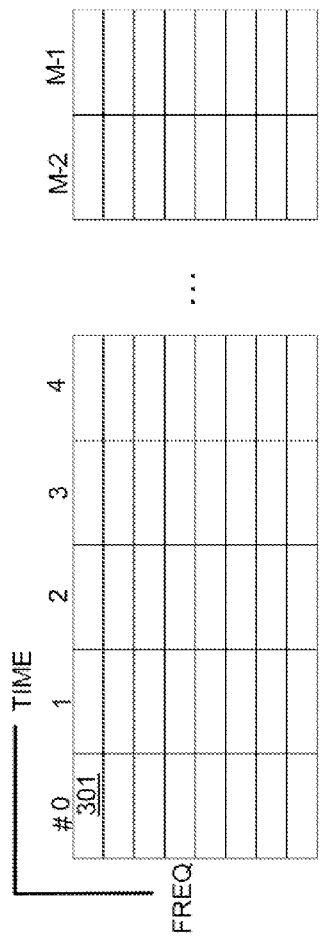
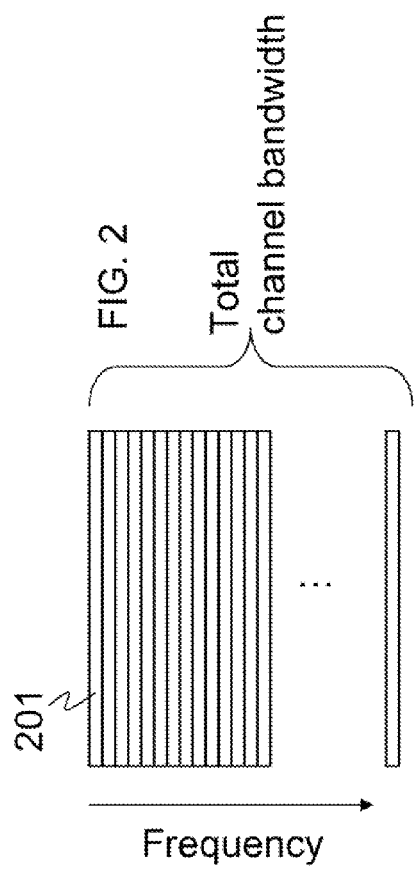
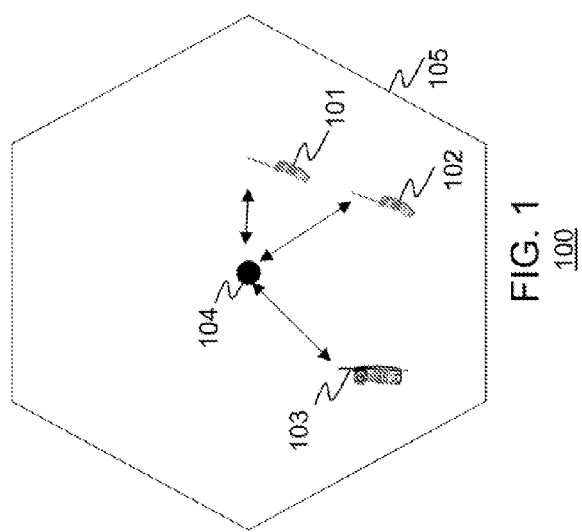

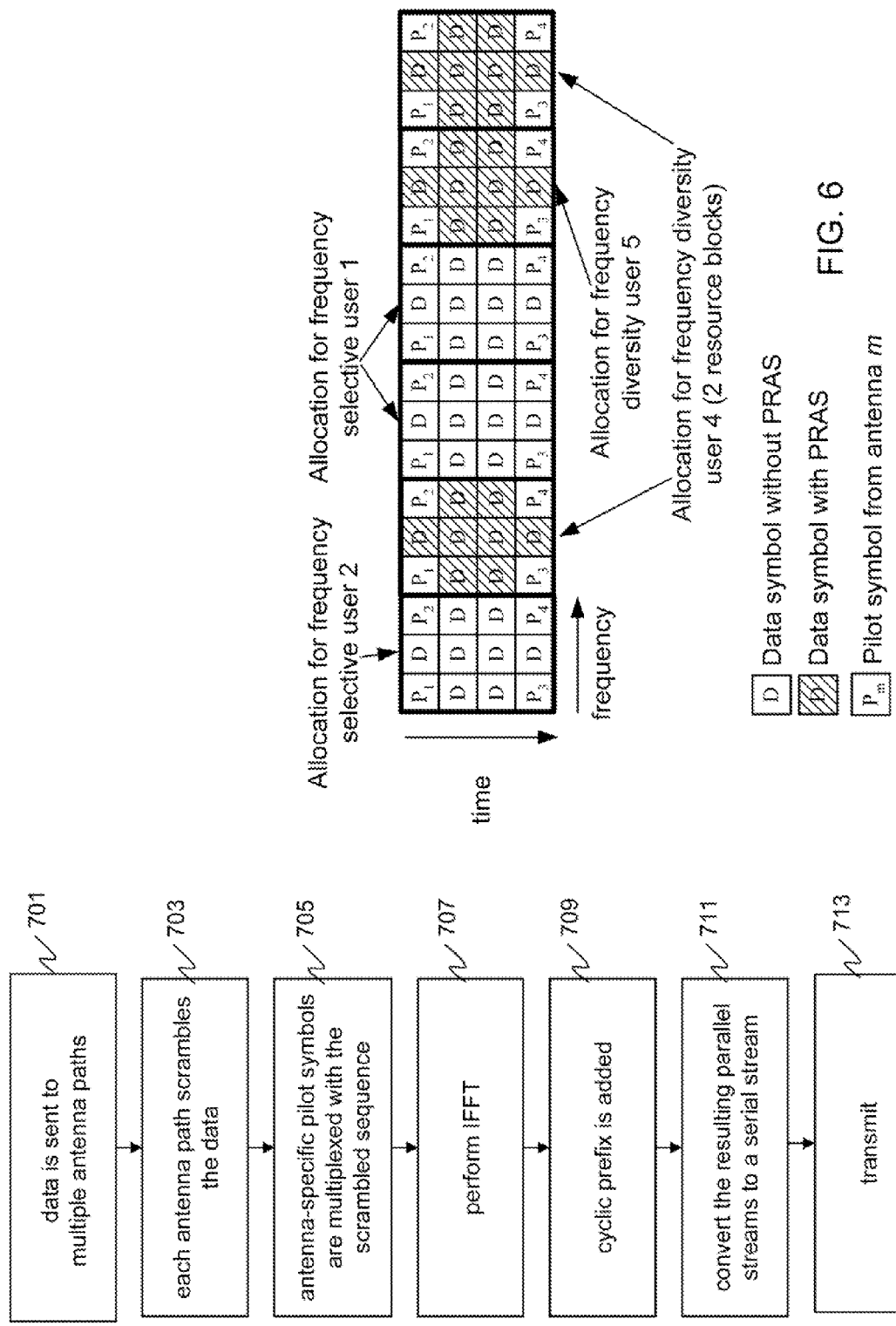

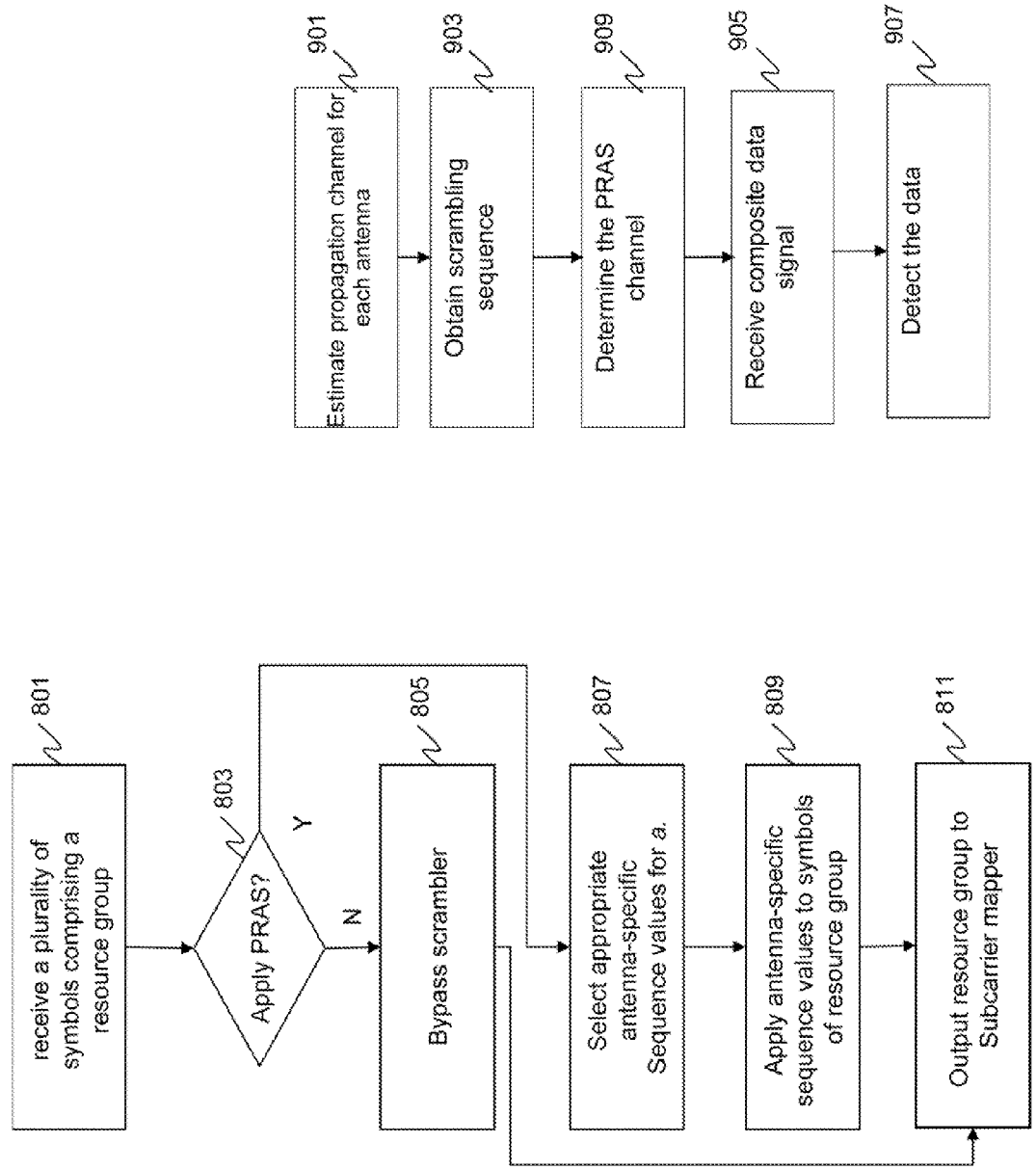

METHOD AND APPARATUS FOR TRANSMISSION WITHIN A MULTI-CARRIER COMMUNICATION SYSTEM

CROSS-REFERENCE TO RELATED APPLICATION

This present application is a divisional application of U.S. patent application No. 11/679,272, filed Feb. 27, 2007.

FIELD OF THE ABOVE TECHNIQUE

The present invention relates generally to resource allocation and transmission and in particular to a method and apparatus for performing resource allocation and transmission that allows both frequency selective and frequency diversity users to be multiplexed using the same resource-block based transmission scheme.

BACKGROUND OF THE ABOVE TECHNIQUE

It is well known that orthogonal frequency division multiplexed (OFDM) systems divide a channel bandwidth into several narrowband subcarriers. Many modern OFDM system proposals include the capability to support frequency-selective resource allocation. During frequency-selective resource allocation, the channel bandwidth is divided into several sub-bands, which may be called tiles or resource blocks. Each resource block includes several adjacent OFDM subcarriers and may span multiple OFDM symbol periods. For example, a resource block in an OFDM system with a 15 kHz subcarrier spacing and a 4.76 us cyclic prefix length could be defined as containing 12 adjacent subcarriers (~180 kHz) by seven OFDM symbol periods (~0.5 msec).

The use of resource blocks enables data allocation to a particular user to be made on the resource block having the best channel quality. However, this requires the user to feed back information to identify the best resource block. At high speeds, the channel can change drastically between the time of the feedback report and the time of the data allocation and transmission, leading to poor performance. An alternative to frequency selective allocation is to use a resource allocation that is not localized in frequency, in order to provide frequency diversity. Users given such an allocation can be called frequency diversity users. Frequency diversity users are typically given an allocation that spans the entire channel bandwidth (such as one subcarrier out of every resource block) so that when a deep fade does occur, it only affects a portion of the allocation rather than the entire allocation, thus providing frequency diversity.

The frequency multiplexing between frequency selective and frequency diversity users could be greatly simplified if the same resource-block based structure could be used for both types of users. Therefore, a need exists for a method and apparatus for performing resource allocation and transmission that allows both frequency selective and frequency diversity users to use the same resource-block based transmission scheme while still being capable of providing frequency diversity to the frequency diversity users.

BRIEF DESCRIPTION OF THE DRAWINGS

FIG. 1 is a block diagram of a communication system.
FIG. 2 illustrates a wideband channel divided into many narrow frequency bands.
FIG. 3 illustrates the two-dimensional nature of OFDM resource allocation.
FIG. 6 illustrates an operational scenario for the proposed PRAS method.
FIG. 7 is a flow chart showing one embodiment of the operation of the multiple antenna transmitter of FIG. 4.
FIG. 8 is a flow chart showing operation of a base station.
FIG. 9 is a flow chart showing operation of the receiver of FIG. 5.

DETAILED DESCRIPTION OF THE DRAWINGS

Figure 4:
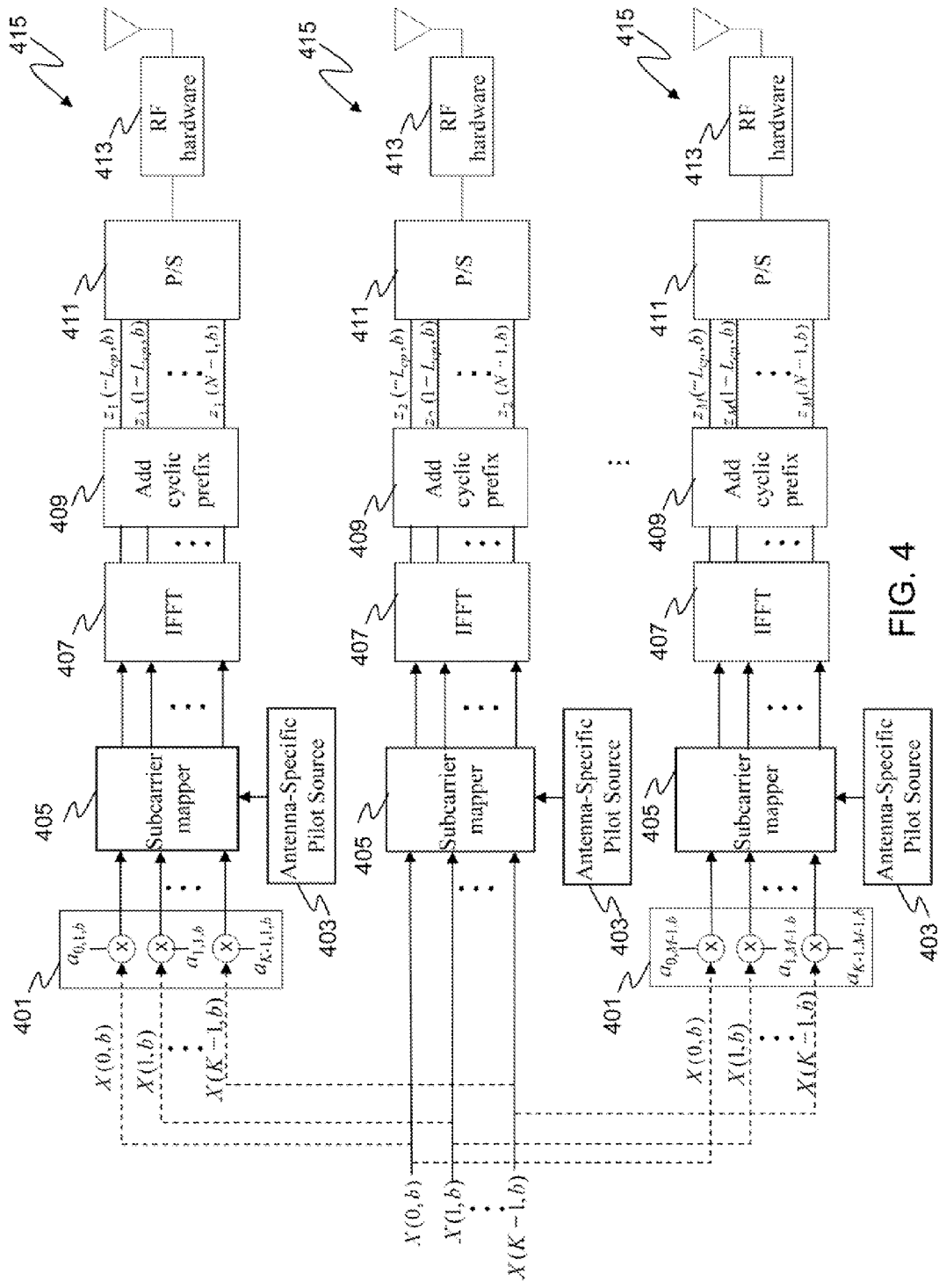
FIG. 4 is a block diagram of a multiple antenna transmitter employing pseudo-random, antenna-specific, scrambling (PRAS) at a base station having M transmit antennas that provide coverage to a sector of a cell.

In order to address the above-mentioned need, multiple transmit antenna transmission together with preferably pseudo-random, antenna-specific, scrambling (PRAS) is utilized to scramble incoming data differently on different antennas for those users requiring frequency diversity type transmissions. When PRAS is activated for a particular allocation, each transmit antenna applies a different scrambling sequence to the data symbols that are transmitted in the allocation (one of the antennas can transmit unscrambled data, or equivalently utilize a scrambling sequence having all scrambling sequence elements equal to one or some other constant value).

The above technique provides the ability to schedule both frequency selective and frequency diversity users simultaneously by frequency division multiplexing, based on the same resource-block-based resource allocation methodology. The above technique accomplishes this goal by converting the transmit diversity at an array of transmit antennas into frequency diversity within a single resource block, thus providing frequency diversity even when the propagation channel is highly correlated within the resource block.

The present invention encompasses a method for multiple antenna transmission. The method comprises the steps of receiving a first set of data symbols for transmission and scrambling the first set of data symbols on a first antenna path based on a first predetermined scrambling sequence. The scrambled data symbols are transmitted from a first antenna on the first antenna path over a first set of time-frequency symbol positions and the first set of data symbols are transmitted, unscrambled (or alternatively, scrambled differently, such as by a second predetermined scrambling sequence), from the a second antenna on a second antenna path on the first set of time-frequency symbol positions.

The present invention additionally encompasses a method for data reception. The method comprises the steps of estimating a first propagation channel for a first transmit antenna, estimating a second propagation channel for a second transmit antenna, and obtaining a scrambling sequence for the second antenna. A composite data signal is received on each of a plurality of time-frequency symbol positions wherein on each time-frequency symbol position the composite data signal comprises a sum of a data symbol transmitted from the first transmit antenna and the data symbol scrambled and transmitted from the second transmit antenna. The composite data symbols are decoded based on the estimated first and second propagation channels and the scrambling sequence.

The present invention additionally encompasses an apparatus comprising a first and a second antenna path existing within a single sector of a base station (or cell) receiving a first set of data symbols for transmission, a scrambler scrambling the first set of data symbols on the first antenna path based on a first predetermined scrambling sequence, a first transmitter transmitting the scrambled data symbols from a first antenna on the first antenna path over a first set of time-frequency symbol positions, and a second transmitter transmitting the first set of data symbols from the second antenna on a second antenna path on the first set of time-frequency symbol positions.

The present invention additionally encompasses a receiver comprising a channel estimator estimating a first propagation channel for a first transmit antenna and a second propagation channel for a second transmit antenna, a receive antenna receiving a composite data signal on each of a plurality of time-frequency symbol positions wherein on each time-frequency symbol position the composite data signal comprises a sum of a data symbol transmitted from the first transmit antenna and the data symbol scrambled and transmitted from the second transmit antenna. Finally decoding circuitry is provided for decoding the composite data symbols based on the estimated first and second propagation channels and the scrambling sequence.

Turning now to the drawings, wherein like numerals designate like components, FIG. 1 is a block diagram of communication system 100. Communication system 100 comprises a one or more cells 105 (only one shown) each having a base transceiver station (BTS, or base station) 104 in communication with a plurality of remote, or mobile units 101-103. In the preferred embodiment of the present invention, communication system 100 utilizes an Orthogonal Frequency Division Multiplexed (OFDM) or multicarrier based architecture, together with multiple transmit antennas. As such, base station 104 employs the multiple antennas (not shown in FIG. 1) to weight and transmit one or more data streams across multiple OFDM subcarriers to one or more receiving devices 101-103. Base station 104 may also use spreading techniques such as multi-carrier CDMA (MC-CDMA), multi-carrier direct sequence CDMA (MC-DS-CDMA), Orthogonal Frequency and Code Division Multiplexing (OFCDM) with one or two dimensional spreading, or may be based on simpler time and/or frequency division multiplexing/multiple access techniques, or a combination of these various techniques. In alternate embodiments, the above technique may be configured to provide time diversity for single carrier communication systems at low Doppler wherein communication system 100 may utilize other wideband cellular communication system protocols such as, but not limited to, single carrier TDMA or direct sequence CDMA.

Remote units 101-103 may also be referred to as a communication units, User Equipment (UE), mobiles, or simply users while base station 104 may also be referred to as a communication unit or simply Node-B. Base station 104 comprises multiple transmitters and one or more receivers that serve a number of remote units within a sector. As known in the art, the entire physical area served by the communication network may be divided into cells, and each cell may comprise one or more sectors. Common cell configurations are single sector with omni-directional antennas, three sector with approximately 120 degree antennas, six sector with approximately 60 degree antennas, etc. Base station 104 employs multiple transmit antennas to serve each sector in order to provide various advanced communication modes (e.g., beamforming, multi-stream transmission or multiple input/multiple output (MIMO) (closed loop or open loop), spatial division multiple access (SDMA), cyclic shift diversity, or other spatial techniques).

As one of ordinary skill in the art will recognize, during operation of an OFDM system, multiple subcarriers 201 (e.g., 768 subcarriers) are utilized to transmit data in a wideband channel. This is illustrated in FIG. 2. As shown in FIG. 2 the wideband channel is divided into many narrow frequency bands (subcarriers) 201, with data being transmitted in parallel on subcarriers 201. FIG. 3 shows the two-dimensional nature of OFDM signals and OFDM resource allocation, with each rectangle in the frequency dimension representing a subcarrier and each rectangle in the time dimension representing an OFDM symbol period. For example, element 301 represents a first subcarrier during a first OFDM symbol period. For an OFDM system, a particular subcarrier on a particular symbol period can be referred to as a time-frequency symbol position (a symbol period in a single-carrier system may also be referred to as a time-frequency symbol position even though the frequency position is typically invariant over time in a single carrier system).

A resource block comprises a set of one or more subcarriers for a set of one or more OFDM symbol periods, for example, 12 adjacent subcarriers by 7 adjacent OFDM symbol periods. Also note that one or more of the time-frequency elements of a resource block may contain pilot symbols. While it is convenient to define a resource block as containing a group of adjacent subcarriers for a group of adjacent OFDM symbol periods (or a group of adjacent time-frequency positions), in general the elements of the resource block are not required to be adjacent. When allocating resources to a user, it is convenient and efficient to allocate in terms of predefined resource blocks rather than individual subcarriers and individual symbol periods, since less signaling overhead is required to allocate a pre-defined resource block entity than would be required to separately/independently allocate each time-frequency element or symbol position of the resource block.

As discussed above, a need exists for a method and apparatus for performing resource allocation and transmission that allows both frequency selective and frequency diversity users to use the same resource-block based transmission scheme. This would enable the frequency domain multiplexing of resources between frequency selective and frequency diversity users to be substantially simplified since the frequency selective users could be allocated to their preferred resource blocks in frequency and then a frequency diversity user could be allocated any of the remaining resource blocks in frequency. But in order to accomplish this with satisfactory performance for the frequency diversity type user, it is necessary to provide some frequency diversity within as little as one resource block (e.g., 12 subcarriers by 7 symbol periods), where the propagation channel may be highly correlated among the subcarriers of the resource block.

In order to address this need, multiple transmit antenna transmission together with preferably pseudo-random, antenna-specific, scrambling (PRAS) is utilized to scramble incoming data differently on different antennas for those users requiring frequency diversity type transmissions. When PRAS is activated for a particular allocation (e.g., for a particular resource block), each transmit antenna applies a different scrambling sequence to the data symbols that are transmitted in the allocation (one of the antennas can transmit unscrambled data, or equivalently utilize a scrambling sequence having all scrambling sequence elements equal to one or some other constant value). For example some of the transmit antenna branches of base station 104 utilize different pseudo random sequences to scramble the incoming symbols that are mapped onto each subcarrier and/or symbol period (or time-frequency symbol position) in a resource block for a given user. The use of a different scrambling sequence on different transmit antennas causes the transmitted symbols from different antennas to add up in different ways on different subcarriers in spite of the potentially high propagation channel correlation between adjacent subcarriers.

At a target receiver, the signal appears to have been transmitted from a single antenna over a composite channel which has nearly independent fading between adjacent subcarriers, thus providing frequency diversity even in a narrowband allocation having a small number of subcarriers. The receiver's perception of nearly independent fading over subcarriers is due to the fact that the receiver sees a composite channel (also known as a PRAS channel or an equivalent channel) which is the sum of pseudo-randomly weighted propagation channels from each transmit antenna. Since the weighting or scrambling values can change on a per-subcarrier basis across antennas, the composite channel can also change significantly even between adjacent subcarriers. Note that in order to properly receive and detect data transmitted with PRAS, the target receiver should have predetermined knowledge of the number of transmit antennas (with different scrambling sequences) being used for the PRAS transmission, and predetermined knowledge of the scrambling sequence(s) used on each of the transmit antennas, and predetermined knowledge of the particular pilot signals or symbols transmitted from each antenna. Such predetermined knowledge can be obtained either implicitly (e.g., based on an air interface specification, or additionally based on cell-specific and/or resource-specific information during operation) or explicitly during operation (e.g., through control signaling or control messages), or some combination of implicit and explicit knowledge.

As described, PRAS randomizes the composite channel that is seen on each subcarrier by randomizing the weight (e.g., the phase if the scrambling sequence has constant amplitude, or the phase and amplitude if the scrambling sequence elements are non-constant amplitude) applied to each subcarrier across both the transmit antennas and the subcarriers (note that PRAS would only be applied to the resource blocks that are for frequency-diversity users). The per-antenna scrambling sequences can be based on any of a variety of forms such as QPSK, 8 PSK, a Zadoff-Chu sequence, or a Generalized Chirp-Like (GCL) sequence (as known in the art) or other known sequences, and are preferably of constant modulus, although this is not required. As an example, a pseudo random QPSK scrambling sequence could be generated by initializing a pseudo-random binary sequence generator with a particular seed value, then generating a set of binary outputs and mapping each pair of output bits to a corresponding QPSK constellation value. In this example, a receiver would be able to generate the same scrambling sequence as the transmitter for demodulation processing (as described later) by obtaining knowledge of the seed value, which could for example be signaled or could be tied to a base station identification parameter such as a cell ID.

Note for the purpose of simplified implementation, one of the transmit antennas does not need to be scrambled, or equivalently it can use a scrambling sequence comprising only the value 1, since it is the phase and/or amplitude difference between antennas on a particular subcarrier that is important. As long as the remaining transmit antennas utilize different pseudo-random scrambling sequences, the composite channel will still appear to be de-correlated over correlated subcarriers (correlated subcarriers occur when the propagation channel is correlated over the frequency spacing between the subcarriers of interest).

The PRAS method can also be used over multiple resource blocks (e.g., for the case where data allocation is large enough to fill more than one resource block). In this case, the multiple resource blocks could be either adjacent, or spaced apart in frequency to further enhance the frequency diversity effect, as will be illustrated later (FIG. 6).

FIG. 4 is a block diagram of a multiple antenna transmitter employing PRAS at base station 104 having M transmit antennas that provide coverage to a sector of a cell (note that alternate embodiments may utilize the above technique in a subscriber unit or other type of communication unit). As shown, the multiple antenna transmitter comprises multiple transmit antenna paths 415, at least some comprising scrambler 401, and each comprising antenna-specific pilot source 403, subcarrier mapper 405, Inverse Fast Fourier Transform (IFFT) circuitry 407, cyclic prefix circuitry 409, parallel-to-serial P/S circuitry 411, and RF hardware 413 that transmits the signal out of the antenna. During operation the same K symbols, X(0,b) through X(K−1,b) for OFDM symbol period or interval b (e.g., all K symbols are part of a particular resource block) enter each antenna path 415 (where the total number of antenna paths will be designated by the integer, M). In the antenna paths that include a scrambler 401 the symbols are scrambled by multiplying each symbol by a known (preferably pseudo random constant-modulus) sequence $[a_{i,m,b}]_{0 \leq i \leq K-1}$, (where i is an integer used to indicate a logical subcarrier index, m is an integer used to indicate antenna number, and b is an integer used to indicate OFDM symbol period or interval, and an example of the pseudo random sequence is one made up of the following pseudo-randomly chosen elements $a_{i,m,b} \in \{1,-1,j,-j\}$). Antenna-specific pilot source 403 provides antenna-specific pilot symbols for each antenna path 415, and subcarrier mapper 405 takes pilot and data symbol inputs and maps them to physical subcarrier indices k according to a predetermined mapping rule. The mapping rule for mapping a logical subcarrier index i to its corresponding physical subcarrier index k is the same in each antenna path 415 so that the scrambled versions of a particular data symbol (e.g., X(0,b), X(0,b)$a_{0,1,b}$, ... X(0,b)$a_{0,M-1,b}$) are transmitted on the same subcarrier $k_0$ from each antenna. Subcarrier mapper 405 also maps one or more antenna-specific pilot symbols onto one or more subcarriers during some OFDM symbol periods b. In the preferred embodiment, pilots may be present at different subcarriers and/or different times from different antennas, as will be illustrated later, and also the pilots are preferably separable/orthogonal among antenna paths (e.g. by being transmitted on different subcarriers or at different times or with different orthogonal pilot sequences) to facilitate per-antenna channel estimation at a receiver. Moreover, it is preferred that when a particular subcarrier is used for a pilot symbol transmission from any antenna, that subcarrier is not used for user data transmission on any of the antennas. Note that the scrambling operation could be applied after the subcarrier mapper rather than before it, if desired.

Note that to simplify FIG. 4 that PRAS is shown for one block of data (e.g., the subcarriers in a resource block) and that in general multiple resource blocks may be multiplexed in frequency (e.g., some resource blocks that employ PRAS and other resource blocks that do not employ PRAS). It should be noted that in the preferred embodiment of the present invention, each of the antenna paths 415 with a scrambler 401 utilizes a different antenna-specific scrambling sequence, $a_{i,m,b}$, and the scrambling sequence elements may also change on different OFDM symbol periods b to further randomize the composite channel within a resource block. The sequence at the output of the mapper 405 on antenna branch m will be referred to as the PRAS sequence on antenna m. Note that the PRAS sequence could contain some resource blocks that do not employ PRAS scrambling (i.e., for frequency-selective users) as well resource blocks that do employ PRAS scrambling (i.e., for frequency-diversity users).

Each of the PRAS sequences on each antenna branch are next converted from the frequency domain into the time domain via IFFT circuitry 407 which performs an N-point IFFT on the PRAS sequence associated with its respective antenna branch. The OFDM transmission technique divides up the occupied frequency bandwidth into orthogonal subcarriers, where each input to the IFFT corresponds to a subcarrier, and the signal fed into each input of the IFFT is said to occupy the corresponding subcarrier.

An optional cyclic prefix is added to each of the frequency-domain scrambled symbols by circuitry 409 after conversion to the time domain by IFFT 407. The cyclic prefix is typically longer than the expected maximum delay spread of the channel. As one of ordinary skill in the art will recognize, the inserted cyclic prefix makes the ordinary convolution of the transmitted signal with the multi-path channel appear as a cyclic convolution when the impulse response of the channel ranges from 0 to $L_{CP}$, where $L_{CP}$ is the length of the cyclic extension.

Parallel-to-serial P/S circuitry 411 converts the parallel streams from the output of the cyclic prefix circuitry 409 to a serial steam and passes the serial stream to RF hardware 413 for transmission. RF hardware 413 transmits the sequence $a_{0,m,b}X(0,b)$ through $a_{K-1,m,b}X(K-1,b)$, on K of the subcarriers of antenna m.

A mathematical description of some aspects of FIG. 4 is now given to help further the understanding of the above-described technique. For this description it will assumed that the resource block consists of K subcarriers and only the transmission of OFDM symbol b in the resource block will be considered (e.g., K time-frequency symbol positions, each on a different subcarrier during the same symbol interval b). For simplicity of description, it is assumed that only the data symbols are being transmitted (no pilot symbols). Also in order to simplify the description, it is assumed that only one resource block is being transmitted (in general there will be more than just one resource block in frequency and/or time and that each resource block may or may not be employing PRAS). In equation form, the frequency-domain PRAS signal on subcarrier k of antenna m, which is input to the IFFT circuitry 407, is given as:

$$Z_m(k,b) = a_{F(k),m,b} X(F(k),b) \quad (1)$$

Where F is a mapping function that maps the physical subcarrier index k to the logical subcarrier index i=F(k). An example of F(k) is F(0)=1, F(1)=3, F(2)=0, and F(3)=2 for the case where K=4.

In one embodiment, the time-domain output of the IFFT circuitry 407 for antenna branch m is expressed as:

$$d_m(n, b) = \frac{1}{\sqrt{K}} \sum_{k=0}^{K-1} Z_m(k, b) e^{j2\pi kn/N} \quad (2)$$

for $0 \leq n \leq N-1$

The output of the IFFT circuitry 407 for antenna branch m is then fed into the cyclic prefix circuitry 409 which creates, in the time domain, a cyclically extended PRAS signal for OFDM symbol b which is given as:

$$z_m(n,b) = d_m((n)_N, b) \text{ for } -L_{cp} \leq n \leq N-1 \quad (3)$$

where $(n)_N$ means n modulus N.

The cyclically extended PRAS signal for OFDM symbol b on antenna branch m is then fed into the P/S circuitry 411 which creates the baseband transmitted signal for antenna m which is given as:

$$r_m(l) = z_m\left((l)_{N+L_{cp}} - L_{cp}, \left\lfloor \frac{l}{N+L_{cp}} \right\rfloor \right) \quad (3)$$

where $\lfloor n \rfloor$ means the largest integer less than or equal to n. The baseband transmitted signal for antenna m is then fed into its respective RF hardware 413 for transmission over the air.

At the mobile an N-point FFT of the received signal (after cyclic prefix removal) will result in the following frequency-domain received signal:

$$Y(k,b) = H_{PRAS}(k,b) X(F(k),b) + N(k,b) \quad (4)$$

where N(k,b) is additive noise and the PRAS or composite channel, $H_{PRAS}(k,b)$, is given as:

$$H_{PRAS}(k, b) = \sum_{m=1}^{M} a_{F(k),m,b} H_m(k, b) \quad (5)$$

Thus the mobile can obtain the composite channel $H_{PRAS}(k,b)$, which is used for data demodulation, by knowing $a_{i,m,b}$ (which can be a cell-specific sequence or mobile-specific specific sequence and needs to be either predefined or signaled by the transmitter as described below), the mapping function, F(k), and estimates of the propagation channel $H_m(k,b)$. Note that H or the channel may also be referred to as a channel response. The estimates of the propagation channel for each antenna m can be obtained through the processing the separable antenna-specific pilot transmissions received from the transmitter. Based on equation (5), it can be understood how the composite channel is randomized on different subcarriers because the per-antenna scrambling sequence causes the propagation channel values to add up differently on different subcarriers.

Figure 5:
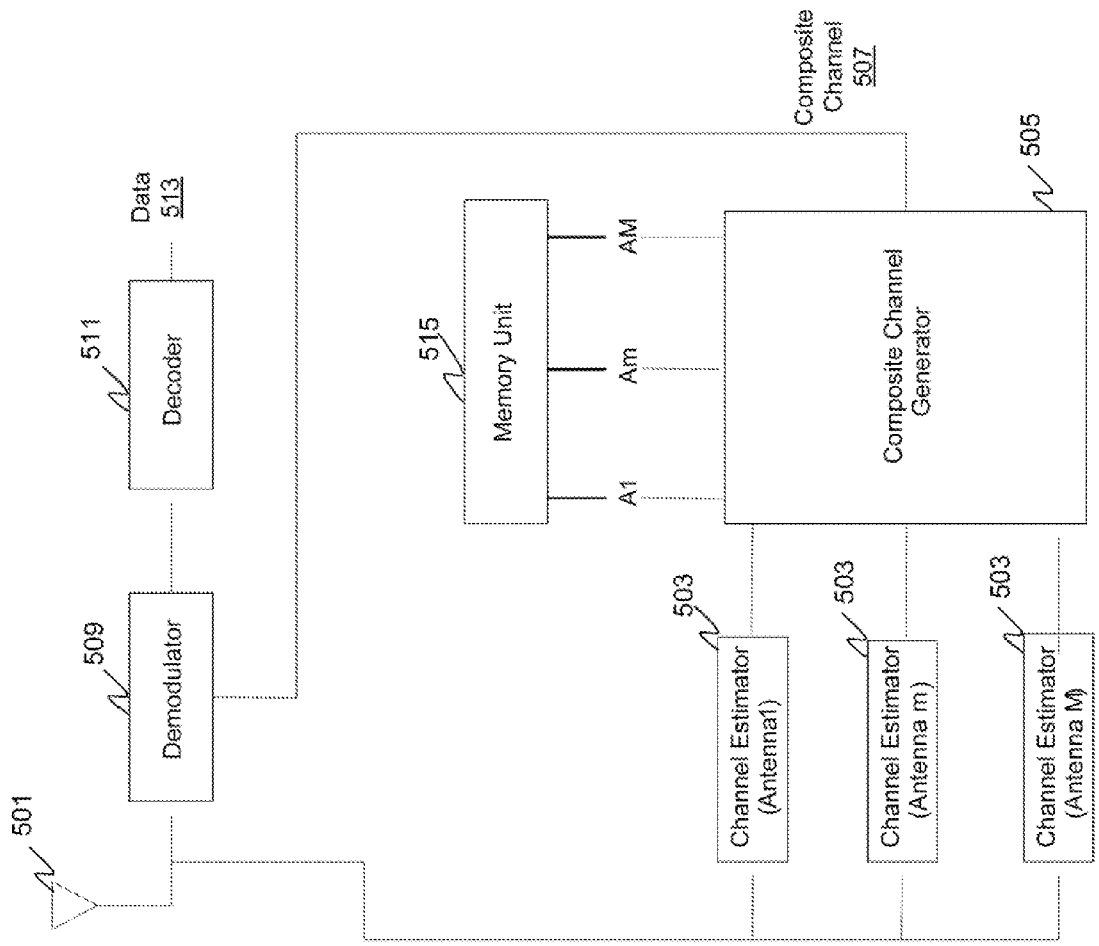
FIG. 5 is a block diagram of a remote or mobile unit.

Note that the receiver needs to know the scrambling code used on each antenna to properly estimate the composite channel and decode the composite received signal. There are various ways to obtain this information. In one example, the scrambling code can be a predetermined sequence based on the cell ID and antenna index m (thus eliminating the need for the BS to signal the scrambling code information) and can vary over OFDM symbol periods as well as subcarriers to provide further randomization within the different symbol periods of a resource block (i.e., $a_{i,m,b}$ could be a function of OFDM symbol number, b, as well). Also, as noted above, the receiver needs to be able to estimate the propagation channel to each transmit antenna separately in order to properly reconstruct the composite channel estimate used for demodulation FIG. 5 is a block diagram of a remote or mobile unit. During operation, a signal is received at antenna 501. Using pilot symbols for transmit antenna m, the propagation channel is estimated by the channel estimator block 503. The estimated propagation channel for each of the M antennas and the M scrambling codes are combined by block 505 to generate the composite channel (also known as the PRAS channel) 507, based on equation (5). The composite channel 507 is then sent to demodulator 509 where coherent demodulation on data coming from antenna 501 are demodulated. These demodulated symbols pass through a channel decoder, deinterleaver, and source decoder (block 511). In addition, but not shown on FIG. 5, the receiver may use more than one receive antenna. In that case, the received signals can then be combined into a single-antenna equivalent signal, using e.g., maximum ratio combining as is known in the art.

An example operational scenario for the proposed PRAS method is shown in FIG. 6. In this scenario, PRAS is applied to the data symbols of any resource block that is assigned to a frequency-diversity user (e.g., user number 4 or user number 5). A resource block in this example is the 4 OFDM symbols by 3 subcarriers, for a total of 12 adjacent time-frequency symbol positions as encased in bold lines. PRAS is not applied to the resource blocks assigned to frequency selective users (e.g., user number 1 and user number 2) since PRAS would randomize the composite channel gains in the resource block, thus possibly negating the benefit of frequency selective scheduling for those users.

Also in FIG. 6, antenna-specific pilots are transmitted in a separable configuration (e.g., on different time-frequency symbol positions for different antennas in this example, although other types of pilot separability such as Walsh coding across a plurality of pilot symbols could alternatively be used). PRAS does not need to be applied to the pilot symbols (P), since the pilots are used for estimation of the propagation channel to each transmit antenna, and the mobile can reconstruct the composite channel on each subcarrier by appropriately combining the per-antenna propagation channel estimates multiplied by the per-antenna scrambling sequence, as described in equation (5). However, in general it is possible to also scramble the values of the pilot symbols as long as the receiver has knowledge of the scrambling values for each pilot symbol on each antenna so that the scrambling effect can be compensated/removed from the pilot symbols prior to channel estimation. Note that a resource block can be designed to have different dimensions than used in this example, and the pilot locations can be different than shown, and it is not necessary to include pilots from each antenna in each resource block. In another operational scenario, PRAS could be used together with cyclic shift diversity (CSD), which is also sometimes referred to as cyclic delay diversity. With CSD, each transmit antenna applies a different circular time shift to its OFDM symbol prior to transmission. One way of implementing CSD would be to insert an antenna-specific cyclic shift block in FIG. 4 between each IFFT 407 and P/S 411. However, in order to enable multiplexing of resource blocks that utilize PRAS and resource blocks that utilize CSD, it is preferred to implement CSD before the IFFT 407 of FIG. 4. Since a circular shift of a sequence in the time domain is equivalent to multiplying the frequency-domain representation of the sequence by a complex phase ramp sequence (e.g., a complex exponential with a linearly increasing phase term), CSD can be applied to a resource block prior to IFFT 407. In one embodiment of this second operational scenario, CSD can be applied to the resource blocks that are allocated to frequency selective users (the use of a small delay value between antennas helps to maintain correlation of the composite channel over the resource block in this case), while PRAS would still be applied to the resource blocks allocated to frequency diversity users. A third operational scenario is to define two classes of PRAS sequences. The first class is the diversity class, which is the same as has been described so far. The second is the frequency selective class. For the frequency selective class, the sequence may be a polyphase sequence with a large number of possible phases (e.g., 32 uniformly spaced possible phases), and the sequence would only have small phase changes between adjacent sequence elements, in order to preserve some of the channel correlation in a resource block. The sequence could even just alternate between a few closely spaced phase values. The frequency selective class of PRAS can also be considered a new type of beamforming.

As is evident in FIG. 6, adjacent resource blocks (e.g., frequency multiplexed) can be used for PRAS and non-PRAS transmissions respectively, thus simplifying the multiplexing of frequency selective and frequency diversity users. For example, PRAS data (first set of data symbols) and non-PRAS data (second set of data symbols) may be received for transmission. The data symbols of the second set may be mapped to at least a first transmit antenna on a second set of time-frequency symbol positions that differs from the first set of time-frequency symbol positions. The second set of data symbols can then be transmitted from an antenna (e.g., the first antenna) on the second set of time-frequency symbol positions. Thus the second set of data symbols may be transmitted from the first antenna on a second set of time-frequency symbol positions from the first antenna as scrambled or unscrambled data symbols. Also the scrambled or unscrambled data symbols may also be transmitted from the second antenna where the time positions of the first set of time-frequency symbol positions coincide with the time positions of the second set of time-frequency symbol positions. Note that the time positions of the first set of time-frequency symbol positions can coincide with the time positions of the second set of time-frequency symbol positions if the transmitter is using OFDM.

FIG. 7 is a flow chart showing one embodiment of the operation of the multiple antenna transmitter of FIG. 4 (e.g. of a base station or a communication unit). The logic flow begins at step 701 where a first set of data symbols is sent to multiple antenna paths. At step 703, each antenna path receives the first set of data symbols and scrambles the data using scramblers 401 and a predetermined scrambling sequence. As discussed above, scrambling takes place using a unique scrambling code that is dependent upon the antenna path (antenna-specific). Thus, a first antenna path will utilize a first scrambling sequence, while a second antenna path will utilize a second scrambling sequence (the second antenna path can possibly use no scrambling sequence) that differs from the scrambling sequence used on the first antenna path. The predetermined scrambling sequence is preferably a pseudo-random sequence in the frequency domain, and the predetermined scrambling sequence preferably comprises constant modulus values. (It should be noted that one antenna path may perform no scrambling).

After scrambling, antenna-specific pilot symbols (or pilot signals) are multiplexed with the scrambled sequence via mapper 405 (step 705) and IFFT 407 performs an IFFT on the resulting data (step 707). A cyclic prefix is added via circuitry 409 (step 709). Finally, P/S circuitry 411 converts the resulting parallel streams to a serial stream (step 711) and transmission takes place via RF hardware 413 (step 713).

The logic flow in FIG. 7 results in the transmission of scrambled data symbols from the first antenna on the first antenna path over a first set of time-frequency symbol positions and the transmission of the first set of data symbols (possibly unscrambled) from the a second antenna on a second antenna path on the first set of time-frequency symbol positions. As discussed, the first and the second antenna paths may exist within a single sector of a base station. Additionally, the first set of time-frequency positions are concurrent in time but on different sub carriers.

It is envisioned that multiple sets of data symbols may be transmitted using the first set of time-frequency symbol positions. In this scenario, a second set of data symbols will be received and either scrambled on the first antenna path based on a second predetermined scrambling sequence or scrambling the second set of data symbols on the second antenna path based on a third predetermined scrambling sequence (both scrambling steps may be performed). The second set of data/scrambled data symbols are transmitted from the first antenna on the first antenna path over the first set of time-frequency symbol positions. The second set of data/scrambled symbols from the second antenna are transmitted on the second antenna path over the first set of time-frequency symbol positions.

It should be noted that in the preferred embodiment a data symbol from the first set of data symbols to be transmitted from the second antenna and the corresponding scrambled data symbol to be transmitted from the first antenna are transmitted on the same time-frequency position within the first set of time-frequency positions (on the same subcarrier and at the same time). For example in OFDM, the data symbol from a first set of data symbols to be transmitted from the second antenna and the corresponding scrambled data symbol to be transmitted from the first antenna are transmitted on the same subcarrier on the same symbol time from both antennas (e.g., both the data symbol and the corresponding scrambled data symbol are transmitted on/within the same rectangle of FIG. 3, or the same square labeled "D" in FIG. 6).

Pilot symbol transmission may take place from each antenna path such that a first pilot symbol is transmitted from the first antenna and a second pilot symbol from the second antenna.

In an additional embodiment $X(0,b)$ through $X(K-1,b)$ may be received by scramblers 401/mapper 405 as data that has been pre-processed to introduce memory among the data symbols. One example of pre-processing to introduce memory is to apply forward error correction encoding to data (e.g., turbo encoded, convolutional encoded, block encoded, or LDPC encoded, etc.) to introduce memory (as is known in the art) among $X(0,b)$ through $X(K-1,b)$. In this scenario, an encoder and symbol mapper would be provided in FIG. 4, existing prior to scramblers 401/mapper 405. The memory introduced between the data symbols by forward error correction coding (pre-processing) helps receiver (FIG. 5) take advantage of the diversity provided by the PRAS method.

Another way to pre-process data to introduce memory among the data symbols to have at least one symbol from $X(0,b)$ through $X(K-1,b)$ comprise spread data. In this scenario, a spreader/mapper/combiner would exist prior to scramblers 401/mapper 405. Each element of a spread data sequence at the output of a spreader/mapper can be $X(0,b)$ through $X(K-1,b)$, or each output of a multicode spreader/mapper/combiner can be $X(0,b)$ through $X(K-1,b)$.

In an additional embodiment (shown in FIG. 6), the multiplexing of PRAS data and non-PRAS data can be done with transmitter 400. In this situation, non-PRAS transmission will take place by bypassing scramblers 401, or by setting the scrambling codes to 1's. Thus, during the transmission of PRAS data, scramblers will be utilized as described in FIG. 7, however, when non-PRAS data is to be transmitted, step 703 will either be omitted, or the scrambling codes in each scrambler 401 will be set to 1.

In an additional embodiment of the present invention, the non-PRAS data may be beamformed. When beamforming the non-PRAS data, beamforming weights may be applied to the data stream via scramblers 401. It is envisioned that both beamformed an non-beamformed data may be transmitted from the same antenna paths. For example, each antenna path may receive a second set of data symbols that are to be beamformed, and then the second set of data symbols will be transmitted over a second set of time-frequency symbol positions from the first and second antennas, wherein one or more beamforming weights for the second set of data symbols are applied to one or both of the first and second antenna paths.

In yet a further embodiment, cyclic-shift diversity (CSD) may be employed for non-PRAS data. This embodiment would employ cyclic shifters to the apparatus shown in FIG. 4, possibly implemented as scramblers 401 employing a complex exponential phase ramp to the non-PRAS data. Other forms of implementing CSD would be to simply employ time shifting circuitry after IFFT 407. CSD is useful for multiplexing PRAS data and beamformed data, or for multiplexing PRAS data with data being transmitted utilizing CSD (when CSD is used, the CSD weights will be correlated over adjacent time-frequency symbol positions). In the case where CSD is not being used for the non-PRAS transmission, the predetermined sequence that is correlated between adjacent sequence elements can be a constant-valued sequence, such as all ones. Specifically, the first set of data symbols would be sent from the transmit antennas using PRAS, but there would also be a second set of data symbols for transmission which would be transmitted over a second set of time-frequency symbol positions using cyclic shift diversity.

In yet an additional embodiment, the above technique is extended to the case of multi-stream multiple-input multiple-output (MIMO) transmission, or spatial division multiple access (SDMA) transmission (also known as multi-user MIMO). In this embodiment, additional data streams may be transmitted simultaneously with $X(0,b)$ through $X(K-1,b)$. For example $Y(0,b)$ through $Y(K-1,b)$ may be transmitted simultaneously with $X(0,b)$ through $X(K-1,b)$, except that $Y(0,b)$ through $Y(K-1,b)$ and $X(0,b)$ through $X(K-1,b)$ will have differing scrambling sequences, $a_{k,m}$ and $c_{k,m}$, respectively. Therefore, data symbols of the second set $(Y(0,b)$ through $Y(K-1,b))$ will be mapped to at least the first transmit antenna and the second antenna on a first set of time-frequency symbol positions (the MIMO/SDMA streams are transmitted on the same time frequency resources). The second set of data symbols will be scrambled via scramblers 401 on at least one of the first and second antennas based on a second predetermined scrambling sequence, and then transmitted on at least a first and a second antenna. The second scrambling sequence is preferably different than the first scrambling sequence so that the MIMO/SDMA streams add up differently on different time-frequency symbol positions.

FIG. 8 is a flow chart showing operation of base station 104, and in particular, the steps to provide the multiplexing of both PRAS data and non-PRAS data to various users (as shown in the example of FIG. 6). The logic flow begins at step 801 where the transmitter receives a plurality of symbols comprising a resource block. Step 803 separates the logic flow for PRAS and non PRAS data. The determination as to whether PRAS is used may be based on whether the data on a particular resource block is for a frequency-selective or frequency-diversity user.

If PRAS is not chosen, the logic flow goes to step 811, essentially bypassing the PRAS process. However, if at step 803 it is determined that PRAS is being utilized, the logic flow continues to step 807 where appropriate values for a are chosen. The values of a could be pseudo-randomly chosen QPSK symbols, and scrambling takes place (step 809). At step 811 the scrambled or unscrambled resource group is output to IFFT circuitry 407.

FIG. 9 is a flow chart showing operation of the receiver of FIG. 5. The logic flow begins at step 901 where the channel estimators 503 estimate a first propagation channel for a first transmit antenna and a second propagation channel for a second transmit antenna. This is accomplished by processing the received pilot symbols from each transmit antenna with a channel estimation technique known in the art. At step 903 the composite channel estimator 505 obtains a scrambling sequence for at least one antenna. In the preferred embodiment this step entails reading the scrambling sequence from memory 515. However this step may alternatively entail determining the scrambling sequence from a received signal or basing the scrambling sequence on a transmitter ID. At step 909 the PRAS channel estimate (i.e., composite channel estimate) is determined with the composite channel estimator 505 using the estimates of the propagation channel and the scrambling sequence. At step 905 a composite data signal is received by the receive antenna 501 on each of a plurality of time-frequency symbol positions wherein on each time-frequency symbol position the composite data signal comprises a sum of a data symbol transmitted from the first transmit antenna and the data symbol scrambled and transmitted from the second transmit antenna. Finally, at step 907 the composite data symbols are detected by the demodulator 509 based on the PRAS channel estimate and the received composite data signal. The demodulated output may then optionally be sent to the decoder 511 to recover the transmitted bit stream based on the estimated first and second propagation channels and the scrambling sequence.

More specifically, the receiver of FIG. 9 estimates a first propagation channel from a first transmit antenna and estimates a second propagation channel for a second transmit antenna at step 901. At step 903, the receiver obtains a scrambling sequence for the second antenna and at step 909 a PRAS channel is determined. At step 905 the receiver receives a composite data signal on each of a plurality of time-frequency symbol positions wherein on each time-frequency symbol position the composite data signal comprises a sum of a data symbol transmitted from the first transmit antenna and the data symbol scrambled and transmitted from the second transmit antenna. And finally in step 907, the receiver detects the composite data symbols based on the estimated first and second propagation channels and the scrambling sequence.

While the above technique has been particularly shown and described with reference to a particular embodiment, it will be understood by those skilled in the art that various changes in form and details may be made therein without departing from the spirit and scope of the above technique. Some examples include, but are not limited to the following:

The above technique can be used for various types of links, such as downlink, uplink, peer-to-peer links, etc. The above technique can also change scrambling sequences over time as well as frequency.

The scrambling code element values do not need to change on every data symbol. For example, the scrambling code value could be held constant over two subcarriers and then change for the next two subcarriers, etc. This example could be realized by stepping through the scrambling code values at a slower rate than once per each data symbol.

When PRAS is applied in an allocation, the maximal diversity effect is realized by applying PRAS to all of the symbols of the allocation. However, it is not required to be applied to every symbol of the allocation. For example, significant benefit can still be obtained by applying PRAS to some subcarriers of the allocation while not applying PRAS to other subcarriers of the allocation, especially if the allocation contains a large number of subcarriers. Basically, not applying PRAS to a particular time-frequency symbol position is equivalent to using a scrambling code that has the same value (e.g., value of 1) on each antenna for that time-frequency symbol position.

In FIG. 4, the antenna path that does not include a scrambler could include a scrambler. The PRAS diversity effect is based on scrambling the data on a particular antenna differently than on another antenna, not on the particular values of the scrambling on one particular antenna. So a scrambler can be included on every antenna in general. Omitting a scrambler from one of the antenna paths, as shown in FIG. 4, simplifies implementation and is equivalent to applying a scrambling sequence with all values equal to 1 to that antenna.

When the number of transmit antennas is greater than 2, some of the antennas can optionally be grouped together and treated as one antenna from the perspective of the above technique. For example, consider a transmitter with 5 antennas in a system that was originally designed to support 4 transmit antennas and supports a maximum of 4 antenna-specific orthogonal pilot streams. Antennas 1-4 can utilize the above technique as described, and antenna 5 could be grouped with antenna 4 by utilizing the same scrambling code on antenna 5 as on antenna 4, and also using the same pilot symbol values and pilot symbol locations as antenna 4. With this configuration, antenna 4 and antenna 5 become one antenna from the perspective of the above technique and the present invention.

For a communication system utilizing a Multiple-Input-Multiple-Output (MIMO) transmission technique, on each resource block, separate data streams may be passed to each antenna. In this case different scrambling sequences can be applied to each stream which results in each stream having its own PRAS channel. Then the MIMO receiver would use the different PRAS channel on each data stream to detect the transmitted symbols. In addition, multiple scrambling sequences can be used for a single data stream to one mobile to create multiple PRAS channels that enable combining space-time coding techniques with PRAS.

It is intended that such changes come within the scope of the following claims:

The invention claimed is:

1. A method for multiple antenna transmission, the method comprising the steps of:
   receiving a first set of data symbols for transmission;
   scrambling the first set of data symbols on a first antenna path based on a first predetermined scrambling sequence;
   transmitting the scrambled data symbols from a first antenna on the first antenna path over a first set of time-frequency symbol positions;
   transmitting the first set of data symbols from a second antenna on a second antenna path on the first set of time-frequency symbol positions;
   wherein the first and the second antenna paths exist within a single sector of a base station.

2. The method of claim 1, further comprising
   transmitting a first pilot symbol from the first antenna; and
   transmitting a second pilot symbol from the second antenna.

3. The method of claim 1 wherein the step of scrambling the first set of data symbols comprises scrambling the first set of data symbols with an antenna-specific scrambling sequence.

4. The method of claim 1 further comprising the step of:
scrambling the first set of data symbols on the second antenna path with a second predetermined scrambling sequence that differs from the first scrambling sequence; and
wherein the step of transmitting the first set of data symbols from the second antenna comprises the step of transmitting the first set of data symbols scrambled with the second predetermined scrambling sequence.

5. The method of claim 1, wherein the first set of data symbols is based on data that has been pre-processed to introduce memory among the first set of data symbols.

6. The method of claim 1, wherein a target receiver of the transmission has knowledge of the first scrambling sequence, and has knowledge that the transmission comprises a first and second antenna path.

7. The method of claim 1 further comprising
receiving a second set of data symbols for transmission;
transmitting the second set of data symbols on a second set of time-frequency symbol positions from the first antenna as scrambled or unscrambled data symbols; and
transmitting the scrambled or unscrambled data symbols on the second antenna.

8. The method of claim 7 wherein the time positions of the first set of time-frequency symbol positions coincide with the time positions of the second set of time-frequency symbol positions 9. The method of claim 1 wherein a data symbol from the first set of data symbols to be transmitted from the second antenna and the corresponding scrambled data symbol to be transmitted from the first antenna are transmitted on the same time-frequency position within the first set of time-frequency positions.

10. The method of claim 1 further comprising:
receiving a second set of data symbols for transmission;
transmitting the second set of data symbols from the first and second antennas over a second set of time-frequency symbol positions using cyclic shift diversity.

11. The method of claim 1 further comprising the steps of:
receiving a second set of data symbols;
transmitting the second set of data symbols over a second set of time-frequency symbol positions from the first and second antennas, wherein one or more beamforming weights for the second set of data symbols are applied to one or both of the first and second antenna paths.

12. The method of claim 1 further comprising
receiving a second set of data symbols for transmission;
performing one or both of (a) and (b):
(a) scrambling the second set of data symbols on the first antenna path based on a second predetermined scrambling sequence;
(b) scrambling the second set of data symbols on the second antenna path based on a third predetermined scrambling sequence;
transmitting the second set of data/scrambled data symbols from the first antenna on the first antenna path over the first set of time-frequency symbol positions;
transmitting the second set of data/scrambled symbols from the second antenna on the second antenna path over the first set of time-frequency symbol positions.

13. The method of claim 1 wherein the step of scrambling the first set of data symbols is performed in the frequency domain 14. The method of claim 1 wherein the first set of time-frequency positions are concurrent in time but on different subcarriers.

* * * * *